United States Patent
Choi et al.

(10) Patent No.: US 10,072,180 B2
(45) Date of Patent: Sep. 11, 2018

(54) COMPOSITION FOR PREPARING ARTICLE CONTAINING POLY(IMIDE-AMIDE), METHOD OF PREPARING THE SAME, AND ARTICLE CONTAINING POLY(IMIDE-AMIDE)

(71) Applicants: SAMSUNG ELECTRONICS CO., LTD., Suwon-si, Gyeonggi-do (KR); SAMSUNG SDI CO., LTD., Yongin-si, Gyeonggi-do (KR)

(72) Inventors: Sungwon Choi, Hwaseong-si (KR); Chanjae Ahn, Seoul (KR); Sungwoo Hong, Seoul (KR); Byunghee Sohn, Yongin-si (KR); Hyunjeong Jeon, Seoul (KR); Kyeong-sik Ju, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/744,621

(22) Filed: Jun. 19, 2015

(65) Prior Publication Data
US 2016/0222249 A1 Aug. 4, 2016

(30) Foreign Application Priority Data
Jan. 30, 2015 (KR) .................. 10-2015-0015219

(51) Int. Cl.
| | |
|---|---|
| C08G 73/10 | (2006.01) |
| C09D 179/08 | (2006.01) |
| B32B 27/08 | (2006.01) |
| C08G 73/14 | (2006.01) |

(52) U.S. Cl.
CPC ....... *C09D 179/08* (2013.01); *C08G 73/1028* (2013.01); *C08G 73/1039* (2013.01); *C08G 73/1042* (2013.01); *C08G 73/1067* (2013.01); *C08G 73/14* (2013.01)

(58) Field of Classification Search
USPC .................. 528/289, 359; 428/435, 473.5
See application file for complete search history.

(56) References Cited

U.S. PATENT DOCUMENTS

| | | | | |
|---|---|---|---|---|
| 3,234,181 A * | 2/1966 | Olivier | ................ | C08G 73/10 524/600 |
| 3,428,486 A * | 2/1969 | George | ................ | H01B 3/306 428/383 |
| 4,320,608 A * | 3/1982 | Deike | ................ | E04H 12/2215 248/316.3 |
| 5,321,097 A * | 6/1994 | Kawaki | ................ | C08G 18/4081 525/424 |
| 9,018,343 B2 * | 4/2015 | Park | ................ | C08G 73/14 525/436 |
| 2004/0096575 A1 * | 5/2004 | Takahashi | ........... | G11B 5/8404 427/128 |
| 2006/0073315 A1 * | 4/2006 | Orikabe | ............. | C23C 18/1641 428/209 |
| 2009/0181478 A1 * | 7/2009 | Cox | ................ | H01L 21/0271 438/22 |
| 2012/0296050 A1 | 11/2012 | Cho et al. | | |
| 2014/0072813 A1 * | 3/2014 | Fujii | ................ | C08G 73/14 428/435 |
| 2015/0057427 A1 | 2/2015 | Cho et al. | | |

FOREIGN PATENT DOCUMENTS

| | | |
|---|---|---|
| JP | 08060541 A | 3/1996 |
| JP | 09111655 A | 4/1997 |
| JP | 10245774 A | 9/1998 |
| KR | 1020130029129 A | 3/2013 |
| KR | 1020150025517 A | 3/2015 |
| WO | WO2013/048126 A1 * | 4/2013 |

OTHER PUBLICATIONS

Shadpour Mallakpour, et al., "Novel nanocomposites based on reactive organoclay of L-tyrosine and amine end-capped poly(amide-imide): Synthesis and characterization", Applied Clay Science 75-76 (2013) 67-73.

* cited by examiner

*Primary Examiner* — Tae H Yoon
(74) *Attorney, Agent, or Firm* — Cantor Colburn LLP

(57) ABSTRACT

A composition for preparing an article including a poly (imide-amide) copolymer, the composition including (i) a copolymer obtained by reacting a tetracarboxylic acid dianhydride represented by Chemical Formula 1, a diamine represented by Chemical Formula 2, and a carboxylic acid dichloride to form a reaction product, followed by removing hydrochloric acid from the reaction product, (ii) an acid anhydride, and (iii) a solvent:

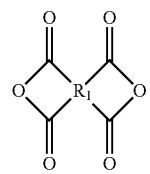

Chemical Formula 1

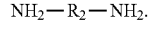

$NH_2-R_2-NH_2$.

Chemical Formula 2

Wherein group $R_1$ in Chemical Formula 1 and group $R_2$ in Chemical Formula 2 are the same as described in the specification.

11 Claims, 10 Drawing Sheets

COMPOSITION FOR PREPARING ARTICLE CONTAINING POLY(IMIDE-AMIDE), METHOD OF PREPARING THE SAME, AND ARTICLE CONTAINING POLY(IMIDE-AMIDE)

CROSS-REFERENCE TO RELATED APPLICATION

This application claims priority to Korean Patent Application No. 10-2015-0015219, filed on Jan. 30, 2015, and all the benefits accruing therefrom under 35 U.S.C. § 119, the content of which is incorporated herein in its entirety by reference.

BACKGROUND

1. Field

This disclosure relates to a composition for preparing an article containing poly(imide-amide), a method of preparing the same, and an article containing poly(imide-amide).

2. Description of the Related Art

The need for flexible portable, low electric power displays that are very light in weight is growing as a display device for delivering various kinds of visual information becomes more and more popular.

In order for fabricating a flexible display, flexible substrate, organic and inorganic materials that need to be processed at a low temperature, flexible electronics, encapsulating, packaging technology, and the like are required.

In order to be used in a flexible display, a transparent plastic film for replacing conventional window cover glass should have high transmittance for light and low yellowness index (YI).

Poly(imide-amide) copolymer has high transmittance for light and low YI, and thus, can be used as a replacement of conventional window cover glass.

There remains a need in new polymeric materials having high transmittance for light and low yellowness index (YI).

SUMMARY

An embodiment provides a composition for preparing an article including a poly(imide-amide) copolymer having high transmittance for light and low yellowness index (YI).

Another embodiment provides an article including a poly (imide-amide) copolymer having high transmittance for light and low yellowness index (YI).

Another embodiment provides a method for preparing a composition for preparing an article including a poly(imide-amide) copolymer having high transmittance for light and low yellowness index (YI).

According to an embodiment, provided is a composition for preparing an article including a poly(imide-amide) copolymer, the composition including:

(i) a copolymer obtained by reacting a tetracarboxylic acid dianhydride represented by Chemical Formula 1, a diamine represented by Chemical Formula 2, and a carboxylic acid dichloride to form a reaction product, followed by removing hydrochloric acid (HCl) from the reaction product, (ii) an acid anhydride, and (iii) a solvent:

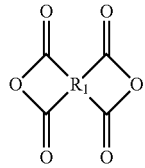

Chemical Formula 1

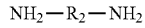

Chemical Formula 2 wherein in Chemical Formula 1 and Chemical Formula 2, $R^1$ and $R^2$ are the same or different, and are each independently a substituted or unsubstituted C4 to C20 alicyclic organic group, or a substituted or unsubstituted C6 to C30 aromatic organic group, wherein the C6 to C30 aromatic organic group includes one aromatic ring, two or more aromatic rings fused together to provide a condensed ring system, or two or more aromatic rings linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein $1 \leq p \leq 10$, —(CF$_2$)$_q$— wherein $1 \leq q \leq 10$, —C(CH$_3$)$_2$—, —C(CF$_3$)$_2$—, —C(=O)NH—, a substituted or unsubstituted C3 to C10 cycloalkylene group, and a substituted or unsubstituted C6 to C15 arylene group.

The tetracarboxylic acid dianhydride represented by Chemical Formula 1 may be at least one selected from 3,3',4,4'-biphenyltetracarboxylic dianhydride, bicycle[2.2.2] oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, and 4-(2,5-dioxotetrahydrofuran-3-yl)-1,2,3,4-tetrahydronaphthalene-1,2-dicarboxylic anhydride.

The diamine represented by Chemical Formula 2 may be at least one selected from the chemical formulae:

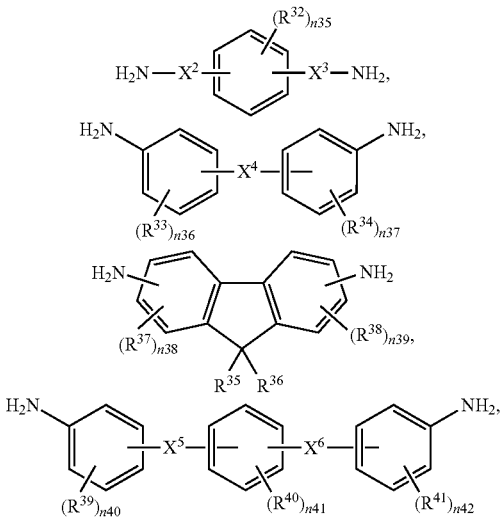

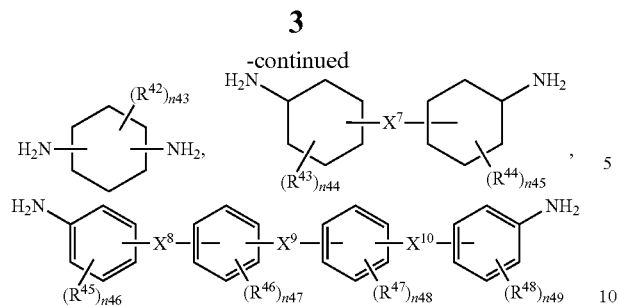

wherein in the above chemical formulae, $R^{32}$ to $R^{45}$ are the same or different and may each independently be hydrogen, a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, $X^2$ to $X^{10}$ are the same or different and may each independently be a single bond, a substituted or unsubstituted C1 to C10 alkylene group, a substituted or unsubstituted C3 to C10 cycloalkylene group, a substituted or unsubstituted C5 to C40 heterocycloalkylene group, a substituted or unsubstituted C6 to C15 arylene group, a substituted or unsubstituted C3 to C40 heteroarylene group, —SO$_2$—, —O—, —C(=O)—, or a combination thereof, n35 to n37, and n40 to n49, are integers ranging from 0 to 4, and n38 and n39 are integers ranging from 0 to 3.

For example, the diamine may be at least one selected from compounds represented by chemical formulae.

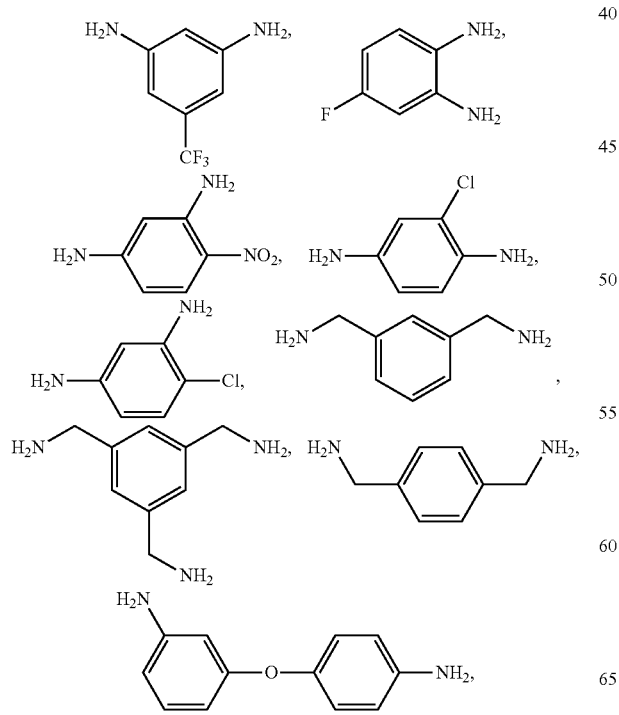

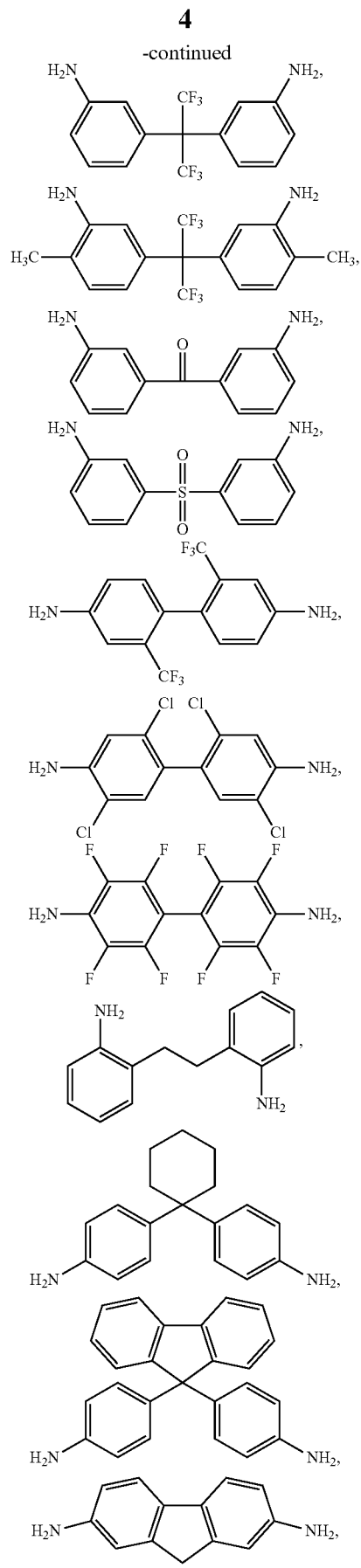

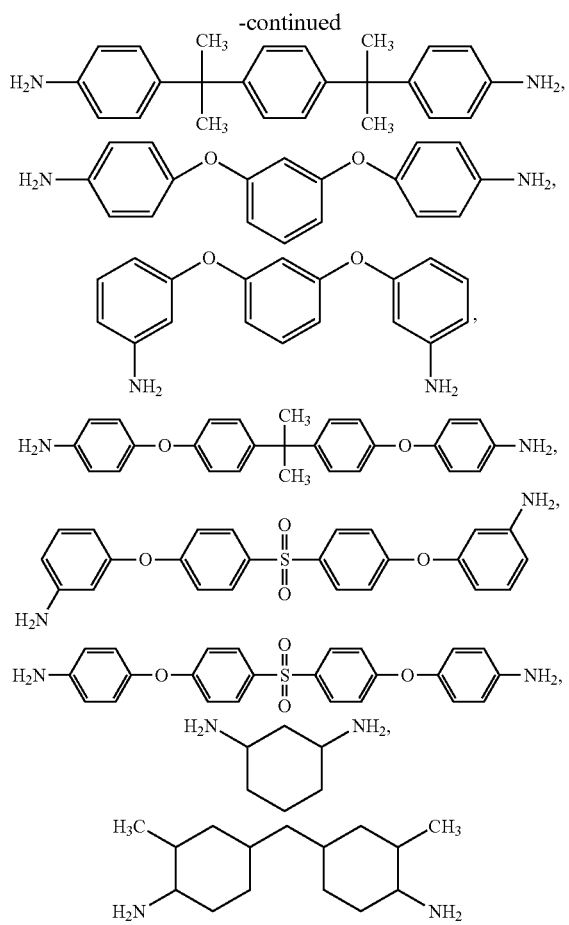

For example, the carboxylic acid dichloride may be at least one selected from terephthaloyl chloride, isophthaloyl chloride, biphenyl dicarbonyl chloride, naphthalene dicarbonyl chloride, terphenyl dicarbonyl chloride, and 2-fluoroterephthaloyl chloride.

For example, the acid anhydride may be at least one selected from acetic anhydride, maleic anhydride, phthalic anhydride, glutaric anhydride, benzoic anhydride, hexanoic acid anhydride, and naphthanoic acid anhydride.

For example, the solvent may be at least one selected from:

a sulfoxide solvent including dimethyl sulfoxide, diethyl sulfoxide, or a combination thereof;

a formamide solvent including N,N-dimethyl formamide, N,N-diethyl formamide, or a combination thereof;

an acetamide solvent including N,N-dimethyl acetamide, N,N-diethyl acetamide, or a combination thereof;

a pyrrolidone solvent including N-methyl-2-pyrrolidone, N-vinyl-2-pyrrolidone, or a combination thereof;

a phenolic solvent including phenol, o-, m-, or p-cresol, xylenol, halogenated phenol, catechol, or a combination thereof; and aprotic bipolar solvent, such as hexamethyl phosphoramide, γ-butyrolactone, or a combination thereof.

An amount of the acid anhydride in the composition may be about 1 percent by weight to about 30 percent by weight based on weight of the copolymer.

The composition may further include pyridine.

An amount of the pyridine may be about 1 percent by weight to about 30 percent by weight based on weight of the copolymer.

According to another embodiment, provided is a composition for preparing an article including a poly(imide-amide) copolymer, wherein an amount of a terminal amino group in the copolymer is less than or equal to about 0.01 millimoles per gram.

The poly(imide-amide) may be a reaction product of a tetracarboxylic acid dianhydride represented by Chemical Formula 1, a diamine represented by Chemical Formula 2, and a carboxylic acid dichloride:

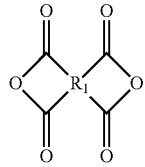

Chemical Formula 1

$$NH_2-R_2-NH_2$$

Chemical Formula 2 wherein in Chemical Formula 1 and Chemical Formula 2, $R^1$ and $R^2$ are the same or different, and are each independently a substituted or unsubstituted C4 to C20 alicyclic organic group, or a substituted or unsubstituted C6 to C30 aromatic organic group, wherein the C6 to C30 aromatic organic group includes one aromatic ring, two or more aromatic rings fused together to provide a condensed ring system, or two or more aromatic rings linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, and a substituted or unsubstituted C6 to C15 arylene group.

According to yet another embodiment, provided is an article including a poly(imide-amide) copolymer prepared according to an embodiment.

The article may be a film, fiber, coating material, or an adhesive.

The article may include a poly(imide-amide) copolymer, wherein an amount of a terminal amino group in the copolymer is less than or equal to about 0.01 millimoles per gram.

According to still another embodiment, provided is a display device including the article.

The display device may be a flexible display device.

According to yet another embodiment, provided is a method of preparing a composition for preparing an article including a poly(imide-amide) copolymer, the method including:

reacting a tetracarboxylic acid dianhydride represented by Chemical Formula 1, a diamine represented by Chemical Formula 2, and a carboxylic acid dichloride to form a reaction product;

removing hydrochloric acid from the reaction product;

obtaining the reaction product; and adding a solvent and an acid anhydride to the obtained reaction product:

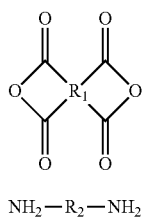

Chemical Formula 1

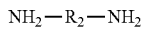

Chemical Formula 2

NH$_2$—R$_2$—NH$_2$ wherein in Chemical Formula 1 and Chemical Formula 2, R$^1$ and R$^2$ are the same or different, and are each independently a substituted or unsubstituted C4 to C20 alicyclic organic group, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, and a substituted or unsubstituted C6 to C15 arylene group.

The adding a solvent and an acid anhydride to the obtained reaction product may include adding a solvent to the obtained reaction product to produce a mixture, and adding an acid anhydride to the mixture of the obtained reaction product and solvent.

The mixture may include about 5 percent by weight to about 30 percent by weight of the obtained reaction product and about 95 percent by weight to about 70 percent by weight % of the solvent.

The adding a solvent and an acid anhydride to the obtained reaction product may further include adding pyridine to the obtained reaction product in an amount of about 1 percent by weight to about 30 percent by weight based on weight of the obtained reaction product.

Hereinafter, embodiments will be further described in detail.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
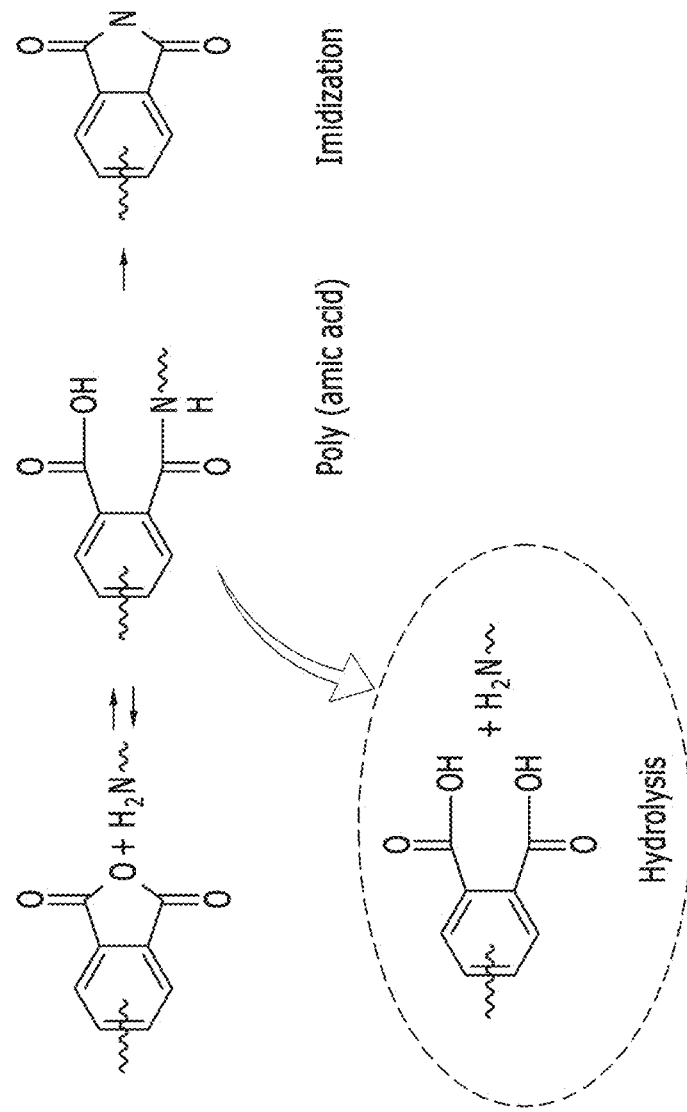
FIG. 1 is a reaction scheme showing production of an amino group at an end of a poly(imide-amide) copolymer in the course of the precipitation process for removing the by-product (HCl) produced in the polymerization process of the poly(imide-amide) preparation, in which the amino group is prepared by the reaction of the polyamic acid, the precursor of the polyimide, and water.

This disclosure will be described more fully hereinafter with reference to the accompanying drawings, in which embodiments are shown. This disclosure may, however, be embodied in many different forms and is not to be construed as limited to the exemplary embodiments set forth herein. Rather, these embodiments are provided so that this disclosure will fully convey the scope of the disclosure to those skilled in the art. Thus, in some exemplary embodiments, well known technologies are not specifically explained to avoid ambiguous understanding of the present inventive concept. Accordingly, the exemplary embodiments are merely described below, by referring to the figures, to explain aspects of the present inventive concept. Expressions such as "at least one of," when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing present embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Therefore, the above words will be understood to imply the inclusion of stated elements but not the exclusion of any other elements.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (—F, —Br, —Cl, or —I), a hydroxyl group, a nitro group, a cyano group, an amino group (—NH$_2$, —NH(R$^{100}$) or —N(R$^{101}$) (R$^{102}$), wherein R$^{100}$, R$^{101}$, and R$^{102}$ are the same or different, and are each independently a C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon having the specified number of carbon atoms and having a valence of at least one. Non-limiting examples of the alkyl group are methyl, ethyl, and propyl.

As used herein, the term "fluoroalkyl group" refers to an alkyl group as defined above, wherein one or more hydrogen atoms are substituted with a fluorine atom. Non-limiting examples of the fluoroalkyl group are fluoromethyl, 2-fluoroethyl, and 3-fluoropropyl.

As used herein, the term "alkoxy group" refers to "alkyl-O—", wherein the term "alkyl" has the same meaning as described above. Non-limiting examples of the alkoxy group are methoxy, ethoxy, propoxy, cyclopropoxy, and cyclohexyloxy.

As used herein, the term "cycloalkyl group" refers to a monovalent group having one or more saturated rings in which all ring members are carbon. Non-limiting examples of the cycloalkyl group are cyclopentyl and cyclohexyl.

As used herein, the term "heterocycloalkyl group" refers to a cycloalkyl group as defined above, wherein one or more of the ring carbon atoms are replaced with a heteroatom selected from O, S, N, P, and Si. Non-limiting example of the heterocycloalkyl group is 2-oxacyclohexyl(2-tetrahydropyranyl).

As used herein, the term "cycloalkoxy group" refers to "cycloalkyl-O—", wherein the term "cycloalkyl" has the same meaning as described above. Non-limiting examples of the cycloalkoxy group are cyclopropoxy and cyclohexyloxy.

As used herein, the term "aryl group", which is used alone or in combination, refers to an aromatic hydrocarbon containing at least one ring. Non-limiting examples of the aryl group are phenyl, naphthyl, and tetrahydronaphthyl.

As used herein, the term "aryloxy group" refers to "aryl-O—", wherein the term "aryl" has the same meaning as described above. Non-limiting examples of the aryloxy group are phenoxy and naphthyloxy.

As used herein, the term "heteroaryl group" refers to an aryl group as defined above, wherein one or more of the ring carbon atoms are replaced with a heteroatom selected from O, S, N, P, and Si. Non-limiting example of the heterocycloalkyl group are 2-pyridyl and 2-furanyl.

As used herein, the terms "alkylene group", "cycloalkylene group", "heterocycloalkylene group", "arylene group", and "heteroarylene group" refer to a divalent group respectively derived from an alkyl group, a cycloalkyl group, a heterocycloalkyl group, an aryl group, and a heteroaryl group as defined above.

As used herein, when a specific definition is not otherwise provided, the term "alkyl group" refers to a C1 to C30 alkyl group, for example a C1 to C15 alkyl group, the term "fluoroalkyl group" refers to a C1 to C30 fluoroalkyl group, the term "cycloalkyl group" refers to a C3 to C30 cycloalkyl group, for example a C3 to C18 cycloalkyl group, the term "alkoxy group" refer to a C1 to C30 alkoxy group, for example a C1 to C18 alkoxy group, the term "ester group" refers to a C2 to C30 ester group, for example a C2 to C18 ester group, the term "ketone group" refers to a C2 to C30 ketone group, for example a C2 to C18 ketone group, the term "aryl group" refers to a C6 to C30 aryl group, for example a C6 to C18 aryl group, the term "alkenyl group" refers to a C2 to C30 alkenyl group, for example a C2 to C18 alkenyl group, the term "alkynyl group" refers to a C2 to C30 alkynyl group, for example a C2 to C18 alkynyl group, the term "alkylene group" refers to a C1 to C30 alkylene group, for example a C1 to C18 alkylene group, the term "cycloalkylene group" refers to a C3 to C30 cycloalkylene group, and the term "arylene group" refers to a C6 to C30 arylene group, for example a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group comprising one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$—, wherein 1≤q≤10, —C(CH$_3$)$_2$—, —C(CF$_3$)$_2$—, and —C(=O)NH—, for example through —S(=O)$_2$—, for example an aryl group or a C6 to C30 arylene group, for example a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, for example a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, "combination" commonly refers to a product of mixing or copolymerization.

Further, the term "copolymer" indicates a random copolymer, block copolymer, graft copolymer, or a combination thereof.

In addition, in the specification, the mark "*" may refer to a point of attachment to another atom.

According to an embodiment, provided is a composition for preparing an article including a poly(imide-amide) including:

(i) a copolymer obtained by reacting a tetracarboxylic acid dianhydride represented by Chemical Formula 1, a diamine represented by Chemical Formula 2, and a carboxylic acid dichloride to form a reaction product, followed by removing hydrochloric acid (HCl) from the reaction product, (ii) an acid anhydride, and (iii) a solvent:

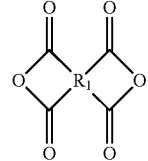

Chemical Formula 1

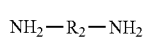

Chemical Formula 2

In Chemical Formula 1 and Chemical Formula 2, $R^1$ and $R^2$ are the same or different, and are each independently a substituted or unsubstituted C4 to C20 alicyclic organic group, or a substituted or unsubstituted C6 to C30 aromatic organic group, wherein the C6 to C30 aromatic organic group includes one aromatic ring, two or more aromatic rings fused together to provide a condensed ring system, or two or more moieties linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a substituted or unsubstituted C3 to C10 cycloalkylene group, and a substituted or unsubstituted C6 to C15 arylene group.

Poly(imide-amide) copolymer has excellent mechanical properties, and thermal and optical properties, and thus is used as a substrate for a display device, such as organic light emitting diode (OLED), liquid crystal display (LCD), and the like. Meanwhile, during the process of preparing poly(imide-amide) copolymer, it is known that hydrochloric acid (HCl) is produced as a by-product in the process of preparing an amide as described in Reaction Scheme 1 below. Hydrochloric acid (HCl) causes corrosion of equipment, and thus is removed by a precipitation reaction.

Reaction Scheme 1

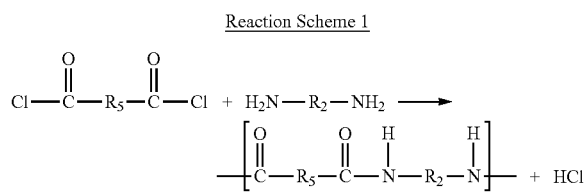

In Reaction Scheme 1, $R_5$ is an aliphatic organic group, an alicyclic organic group, or an aromatic organic group, and $R_2$ is the same as defined in Chemical Formula 2.

However, water added to the reactor to form HCl during the precipitation process hydrolyzes amino group of the polyamic acid, the precursor of the poly(imide-amide) copolymer, causing increase in the content of the amino group at an end of the poly(imide-amide) copolymer (terminal amino group) after the precipitation process. The amino group at an end of the copolymer may cause color change in the copolymer upon oxidization at a high temperature, leading increase of yellowness index (YI) of the copolymer containing the amino group at an end.

As mentioned above, a transparent plastic film has improved transmittance of light and low yellowness index for replacing the window cover glass in a flexible display. In this regard, it may be important to decrease the content of the amino group at an end of the composition including poly(imide-amide) copolymer or of the article prepared from the composition.

The inventors have found that the content of amino group at an end of poly(imide-amide) copolymer may be reduced by adding acid anhydride to the reaction product of a tetracarboxylic acid dianhydride, diamine, and a carboxylic acid dichloride after the precipitation process when HCl is removed from the reaction product. That is, it has been confirmed that, when preparing an article including poly(imide-amide) copolymer, it is possible to reduce the content of the amino groups at an end of the copolymer in the reaction solution, as well as to reduce the yellowness index of the article prepared from the reaction solution, by adding acid anhydride to the final reaction solution for preparing the article.

Without wishing to be bound by a specific theory, it is believed that the reduction of the content of the amino group at an end of poly(imide-amide) copolymer may be caused by the acylation reaction between the acid anhydride added to the final reaction solution and an amino group at an end of the copolymer, whereby the amino group at an end may be capped.

Figure 2:
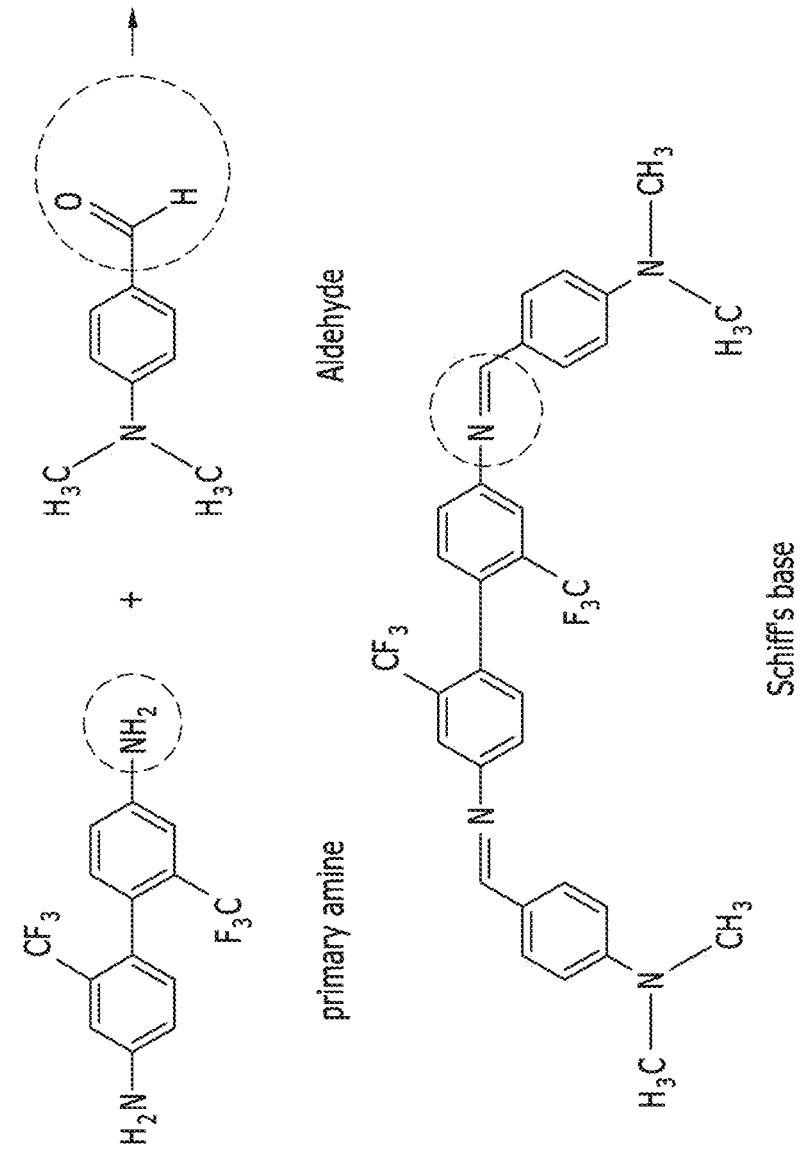
FIG. 2 shows a reaction scheme of production of Schiff's base, which is used for measuring an amount of the amino group at an end of the copolymer.

The content of the amino group at an end of the copolymer in the reaction solution or in the article prepared from the copolymer may be determined by measuring the concentration of Schiff's base. For example, as depicted in FIG. 2, Schiff's base is formed by a reaction between a compound having an amino group at an end (for example, TFDB in FIG. 2) and an aldehyde group of para-(N,N-dimethyl amino)-phenyl aldehyde. Measurement of the content of the Schiff's base may provide information about the content of an amino group at an end in the reactors.

The content of amino group at an end in the composition according to an embodiment and in the article prepared from the composition may be less than or equal to about 0.01 millimoles per gram (mmol/gram).

As described below in the examples and comparative examples, when a film is prepared by reacting a tetracarboxylic acid dianhydride, a diamine, and a carboxylic acid dichloride to prepare a precursor of poly(imide-amide) copolymer, followed by adding acid anhydride to the copolymer dissolved in a solvent according to the examples, and the prepared film is dissolved in a solvent, the content of the amino group at an end of the solution in which the film is dissolved is reduced as much as about 50% compared to the content of the amino group at an end of the solution in which the other films prepared from the reaction product of a tetracarboxylic acid dianhydride, a diamine, and a carboxylic acid dichloride, which is not treated with the acid anhydride after being prepared as a copolymer, according to the comparative examples. Further, the content of all amino groups at an end of the films according to the examples are determined as less than or equal to 0.01 mmol/gram upon measuring the Schiff's base.

The content of the amino group at an end of the film may be determined by measuring the content of Schiff's base formed in the solution formed when the film is dissolved in a solvent.

Figure 6:
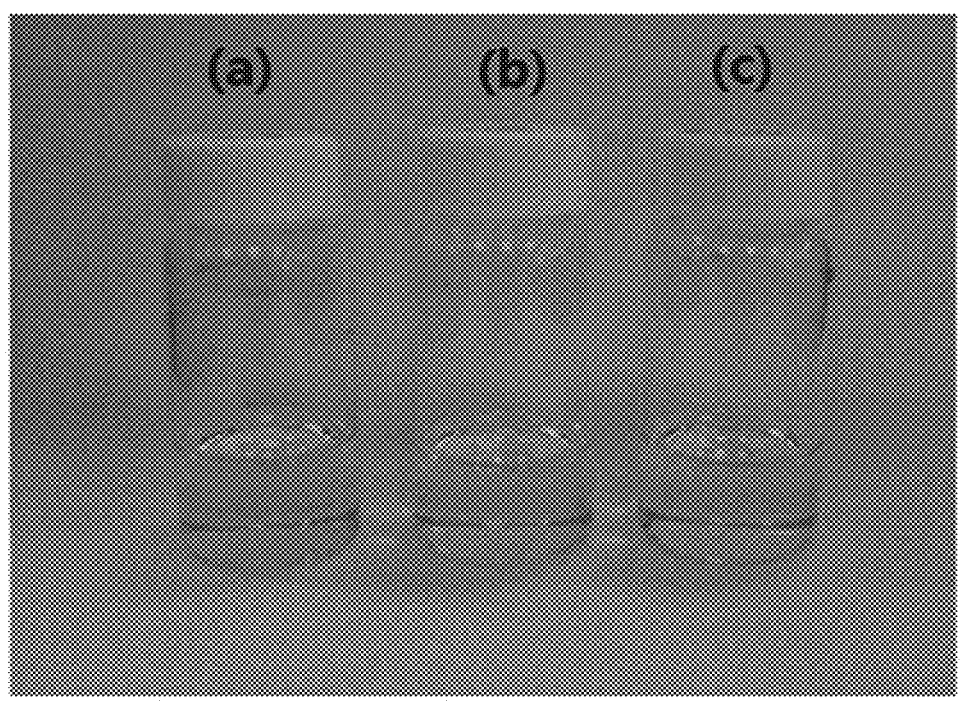
FIG. 6 is a photograph of the solutions in which the films prepared by heating the compositions according to Comparative Example 1(a), Example 1(b), and Example 2(c) from room temperature to 300° C. at heating rate of 3° C./min, respectively, are dissolved in a solvent (DMAc)
Figure 7:
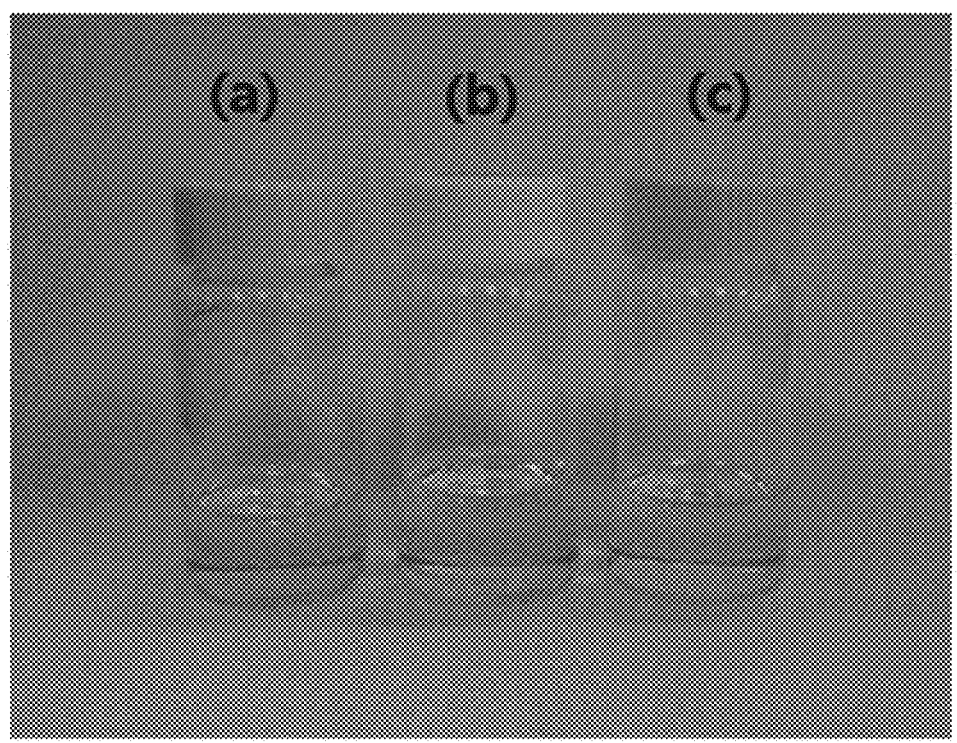
FIG. 7 is a photograph of the solutions in which the films prepared by heating the compositions according to Comparative Example 2(a), Example 3(b), and Example 4(c) from room temperature to 300° C. at heating rate of 3° C./min, respectively, are dissolved in a solvent (DMAc).
Figure 8:
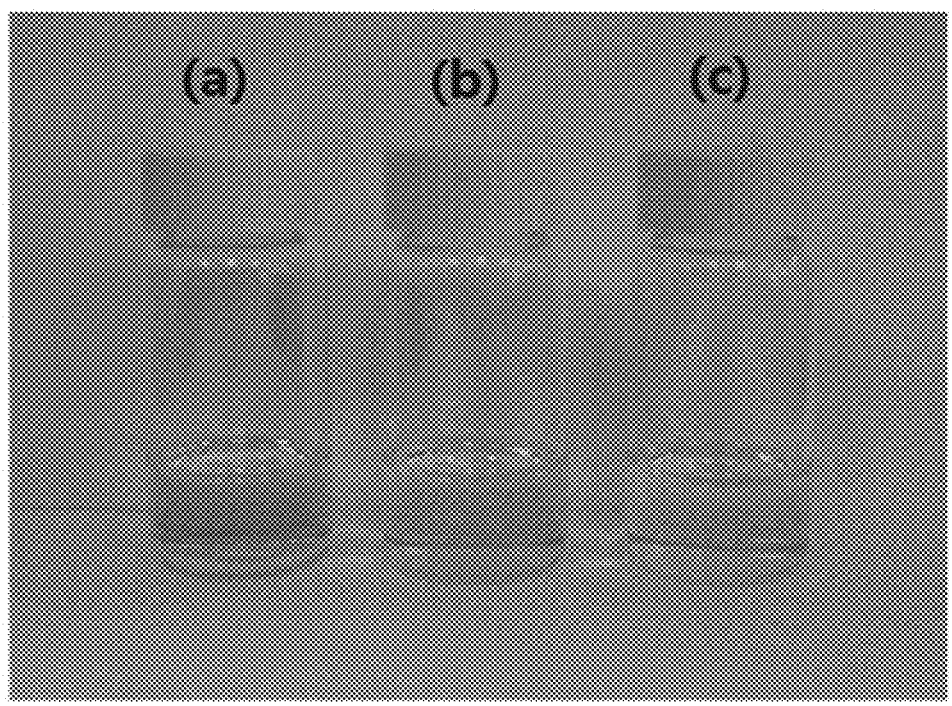
FIG. 8 is a photograph of the solutions in which the films prepared by heating the compositions according to Comparative Example 3(a), Example 5(b), and Example 6(c) from room temperature to 300° C. at heating rate of 3° C./min, respectively, are dissolved in a solvent (DMAc)

In an exemplary embodiment, the composition may further include pyridine along with the acid anhydride. When including pyridine, as well as acid anhydride, as shown in FIGS. 6 to 8, yellowness of the films or articles prepared from therefrom may be further reduced. As mentioned above, copolymers or articles prepared from the copolymers having high content of amino groups at an end suffer from having a large extent of yellowness, and thus, upon including both acid anhydride and pyridine, capping effect of the amino group at an end may improve.

The composition according to an embodiment may be prepared by:

reacting any tetracarboxylic acid dianhydride, any diamine, and any carboxylic acid dichloride to prepare a poly(imide-amide) copolymer, removing HCl from the poly(imide-amide) copolymer during precipitation reaction, followed by adding acid anhydride, and pyridine if required, to the poly(imide-amide) copolymer in a solvent. However, in order to achieve excellent optical, thermal, and mechanical properties of the copolymer, a tetracarboxylic acid dianhydride represented by Chemical Formula 1 and a diamine represented by Chemical Formula 2 may be used.

In an exemplary embodiment, the tetracarboxylic acid dianhydride represented by Chemical Formula 1 may be at least one selected from 3,3',4,4'-biphenyltetracarboxylic dianhydride ("BPDA"), bicycle[2.2.2]oct-7-ene-2,3,5,6-tetracarboxylic dianhydride ("BTDA"), 3,3',4,4'-diphenylsulfone tetracarboxylic dianhydride ("DSDA"), 4,4'-(hexafluoroisopropylidene)diphthalic anhydride ("6FDA"), 4,4'-oxydiphthalic anhydride ("ODPA"), pyromellitic dianhydride ("PMDA"), and 4-(2,5-dioxotetrahydrofuran-3-yl)-1,2,3,4-tetrahydronaphthalene-1,2-dicarboxylic anhydride ("DTDA"), and is not limited thereto.

In an exemplary embodiment, the tetracarboxylic acid dianhydride represented by Chemical Formula 1 may be at least one selected from 3,3',4,4'-biphenyl tetracarboxylic dianhydride ("BPDA"), and 4,4'-(hexafluoroisopropylidene)diphthalic anhydride ("6FDA").

In an exemplary embodiment, the tetracarboxylic acid dianhydride represented by Chemical Formula 1 may include 3,3',4,4'-biphenyl tetracarboxylic dianhydride ("BPDA") and pyromellitic dianhydride ("PMDA") in a mole ratio of about 50 to 95:about 5 to 50, for example, about 60 to 90:about 10 to 40, for example about 70 to 80:about 20 to 30.

In an exemplary embodiment, the diamine represented by Chemical Formula 2 may be at least one selected from following chemical formulae:

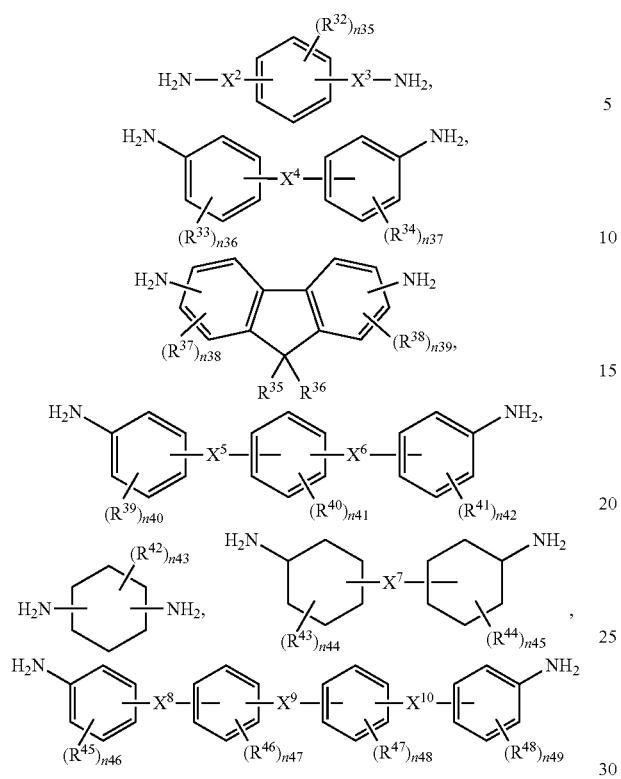

In the above chemical formulae,

R$^{32}$ to R$^{45}$ are the same or different and may each independently be hydrogen, a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C2 to C15 heteroaryl group, X$^2$ to X$^{10}$ are the same or different and may each independently be a single bond, a substituted or unsubstituted C1 to C10 alkylene group, a substituted or unsubstituted C3 to C10 cycloalkylene group, a substituted or unsubstituted C5 to C40 heterocycloalkylene group, a substituted or unsubstituted C6 to C15 arylene group, a substituted or unsubstituted C3 to C40 heteroarylene group, —SO$_2$—, —O—, —C(=O)—, or a combination thereof, n35 to n37, and n40 to n49, are integers ranging from 0 to 4, and n38 and n39 are integers ranging from 0 to 3.

For example, the diamine may be at least one selected from compounds represented by following chemical formulae:

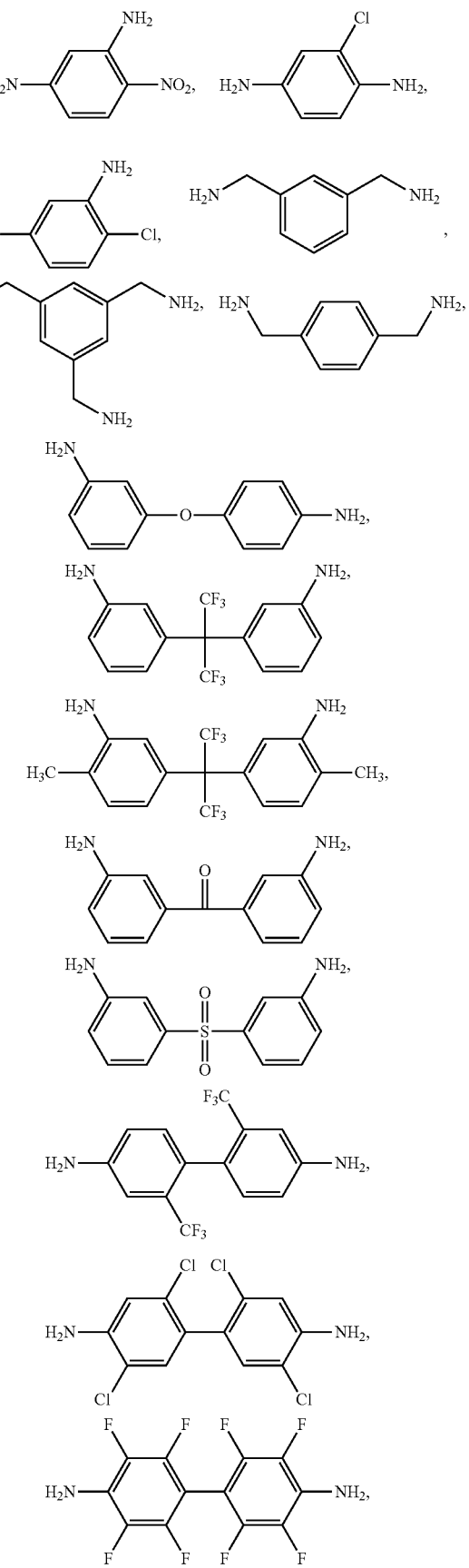

-continued

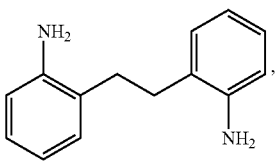

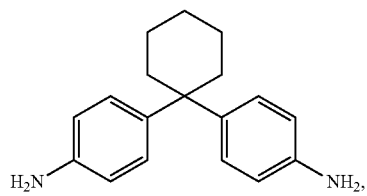

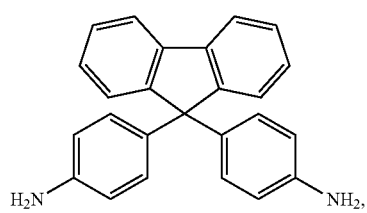

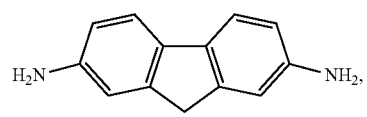

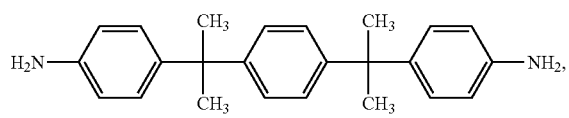

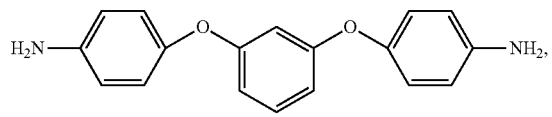

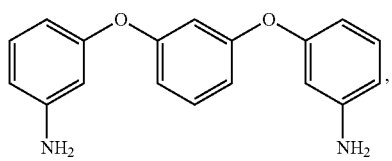

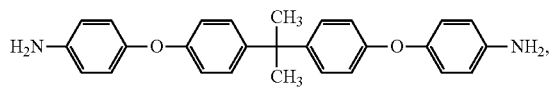

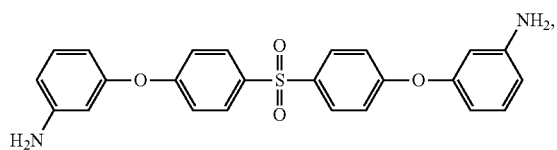

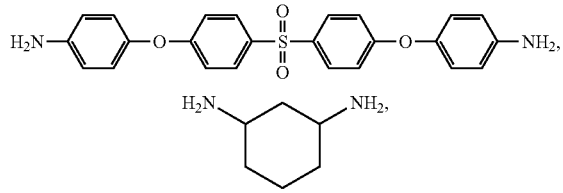

-continued

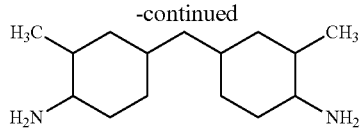

In an exemplary embodiment, the diamine represented by Chemical Formula 2 may be 2,2'-bis(trifluoromethyl)benzidine ("TFDB").

Any carboxylic acid dichloride may be used to form an amide by reacting with the diamine as described above.

In an exemplary embodiment, the carboxylic acid dichloride may be at least one selected from terephthaloyl chloride (TPCl), isophthaloyl chloride (IPCl), biphenyl dicarbonyl chloride (BPCl), naphthalene dicarbonyl chloride, terphenyl dicarbonyl chloride, and 2-fluoro-terephthaloyl chloride.

For example, the carboxylic acid dichloride may be at least one selected from isophthaloyl chloride (IPCl) and biphenyl dicarbonyl chloride (BPCl.

Any acid anhydride may be used to cap an amino group at an end by reacting with the amino group at an end.

In an exemplary embodiment, the acid anhydride may be at least one selected from acetic anhydride, maleic anhydride, phthaloic anhydride, glutaric anhydride, benzoic anhydride, hexanoic acid anhydride, and naphthanoic acid anhydride.

For example, the acid anhydride may be acetic anhydride.

In an exemplary embodiment, the solvent may be at least one selected from:

a sulfoxide solvent, such as dimethyl sulfoxide, diethyl sulfoxide, and the like;

a formamide solvent, such as N,N-dimethyl formamide, N,N-diethyl formamide, and the like;

an acetamide solvent, such as N,N-dimethyl acetamide, N,N-diethyl acetamide, and the like, or a combination thereof;

a pyrrolidone solvent, such as N-methyl-2-pyrrolidone, N-vinyl-2-pyrrolidone, and the like, or a combination thereof;

a phenolic solvent, such as phenol, o-, m-, or p-cresol, xylenol, halogenated phenol, catechol, and the like, or a combination thereof;

an aprotic bipolar solvent, such as hexamethyl phosphoramide, γ-butyrolactone, and the like, or a combination thereof, but is not limited thereto.

The acid anhydride may be included in an amount of about 1 percent by weight (weight %) to about 30 weight % based on the weight of the copolymer.

The copolymer may be included in an amount of about 5 weight % to about 30 weight % based on the weight of the composition.

The solvent may be included in an amount of balance in the composition.

The pyridine may be included in an amount of about 1 weight % to about 30 weight % based on the weight of the copolymer.

According to yet another embodiment, provided is a method of preparing a composition for preparing an article including a poly(imide-amide) copolymer, the method including:

reacting a tetracarboxylic acid dianhydride represented by Chemical Formula 1, a diamine represented by Chemical Formula 2, and a carboxylic acid dichloride to form a reaction product;

removing hydrochloric acid (HCl) from the reaction product;

obtaining the reaction product, which has been separated from HCl; and adding a solvent and an acid anhydride to the obtained reaction product:

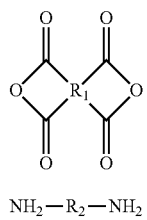

Chemical Formula 1

NH₂—R₂—NH₂  Chemical Formula 2 wherein in Chemical Formula 1 and Chemical Formula 2, $R^1$ and $R^2$ are the same or different, and are each independently a substituted or unsubstituted C4 to C20 alicyclic organic group, or a substituted or unsubstituted C6 to C30 aromatic organic group, wherein the aromatic organic group includes one aromatic ring, two or more aromatic rings fused together to provide a condensed ring system, or two or more aromatic rings linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein $1 \leq p \leq 10$, —(CF$_2$)$_q$— wherein $1 \leq q \leq 10$, —C(CH$_3$)$_2$—, —C(CF$_3$)$_2$—, —C(=O)NH—, a substituted or unsubstituted C3 to C10 cycloalkylene group, and a substituted or unsubstituted C6 to C15 arylene group.

The removing HCl from the reaction product may include adding a solvent (such as alcohol) to the reaction product. The precipitation process for removing HCl as by-product by adding a solvent (such as alcohol) to the reaction product and removing the by-product dissolved in water by filtration is well known and widely used in the polymerization process of polyamide or poly(imide-amide). By adding alcohol to the reaction product, water is produced and simultaneously the product, which is the copolymer, precipitates.

Accordingly, the obtaining the product removed from the HCl may include filtering, drying and grinding to a powder the precipitated products in the process for removing HCl. By adding solvent and acid anhydride to the powdered product, the composition for preparing the article may be obtained.

The adding a solvent and an acid anhydride to the obtained reaction product may include adding a solvent to the obtained reaction product, and then adding an acid anhydride to the mixture of the obtained reaction product and solvent.

The adding a solvent to the obtained reaction product may provide a mixture of the solvent and the obtained reaction product including an amount of about 5 weight % to about 30 weight % of the obtained reaction product and an amount of about 95 weight % to about 70 weight % of the solvent.

In an exemplary embodiment, the adding a solvent to the obtained reaction product may provide a mixture of the solvent and the obtained reaction product including an amount of about 5 weight % to about 25 weight % of the obtained reaction product and an amount of about 95 weight % to about 75 weight % of the solvent.

The adding an acid anhydride to the mixture of the obtained reaction product and solvent may include adding an acid anhydride in an amount of about 1 weight % to about 30 weight % based on the weight of the obtained reaction product to the mixture of the obtained reaction product and solvent.

The adding an acid anhydride to the mixture of the obtained reaction product and solvent may further include adding pyridine in an amount of about 1 weight % to about 30 weight % based on the weight of the obtained reaction product to the mixture of the obtained reaction product and solvent.

By adding solvent, acid anhydride, and/or pyridine in the above amounts to the obtained reaction product, the added acid anhydride, and/or pyridine may cap the amino group at an end of the obtained reaction product, whereby the content of the amino group at an end in the obtained reaction product may be reduced.

By adding pyridine, along with acid anhydride, to the mixture of the solvent and the obtained reaction product, capping the amino group at an end by the acid anhydride may be promoted.

The method may further include partial imidization of the reaction product between reacting a tetracarboxylic acid dianhydride represented by Chemical Formula 1, a diamine represented by Chemical Formula 2, and a carboxylic acid dichloride to form a reaction product and removing hydrochloric acid (HCl) from the reaction product. The partial imidization may include a thermal imidization or a chemical imidization, which partially imidizes the composition for preparing an article by adding a chemical imidization agent or by performing heat treatment before completely imidizing the composition by heat treatment. The reduction of molecular weight of the reaction product of the copolymer may be prohibited by the partial imidization.

The tetracarboxylic acid dianhydride represented by Chemical Formula 1, the diamine represented by Chemical Formula 2, and the carboxylic acid dichloride, the acid anhydride, and the solvent are the same as described for the composition for preparing an article including poly(imide-amide), and detailed descriptions are omitted.

According to another embodiment, provided is an article including poly(imide-amide) copolymer prepared from the composition according to the embodiment.

The article may be a film, fiber, coating material, or adhesive material, and is not limited thereto.

The content of the amino group at an end in the article may be less than or equal to about 0.01 mmol/gram.

As described above, the content of the amino group at an end in the article may be determined by dissolving the article in a solvent and forming and measuring the content of the Schiff's base.

Within the above range of the content of the amino group at an end in the article, yellowness index of the article may be reduced.

The article may be formed from the composition for preparing an article including poly(amide-imide) copolymer using a dry-wet method, a dry method, or a wet method, but this disclosure is not limited thereto.

According to an exemplary embodiment when the article is a film, the film may be manufactured using the composition through the dry-wet method, where a layer is formed by extruding the poly(amide-imide) copolymer from a mouth piece on a supporter, such as drum or an endless belt, drying the layer, and evaporating the solvent out of the layer until the layer has a self-maintenance property. The drying may be performed at about 25° C. to about 300° C. for about 1 hour or less. When the surface of the drum and/or the endless belt used for the drying process becomes flat, a layer with a flat surface is formed. The layer obtained after the drying process is delaminated from the supporter, and treated in a wet process, desalted and/or desolventized. The manufacturing of the film is completed as the layer is elongated, dried, and/or heat treated.

The elongating conforms to a draw ratio, which may range from about 0.8 to about 8 in terms of surface ratio. According to an embodiment, it may range from about 1.3 to about 8. As used herein, the term "surface ratio" refers to a value obtained by dividing the area of a layer after the elongating, by an area of the layer before the elongating. A value of 1 or less denotes a relaxed state. According to an exemplary embodiment, the elongating may be performed not only in a surface direction but also in a thickness direction.

The heat treatment may be performed at a temperature of about 200° C. to about 500° C., particularly at about 250° C. to about 400° C., for about a few seconds to about a few minutes.

Also, the layer after elongating and heat treatment may be cooled slowly, particularly at a speed of about 50° C./second or lower.

The layer may be formed as a single layer or as multiple layers.

An article including the poly(amide-imide) copolymer may have a total light transmittance of about 80% or higher, for example, of about 85% or higher, for example, of about 88% or higher, at a wavelength range of about 380 nanometers (nm) to about 750 nm, and may have light transmittance of about 70% or higher, for example, of about 80% or higher, for example, of about 85% or higher, at a wavelength of about 430 nm.

When the light transmittance of the article including the poly(amide-imide) copolymer is within this range, the article including the poly(amide-imide) copolymer may have excellent or improved color reproducibility.

Figure 9:
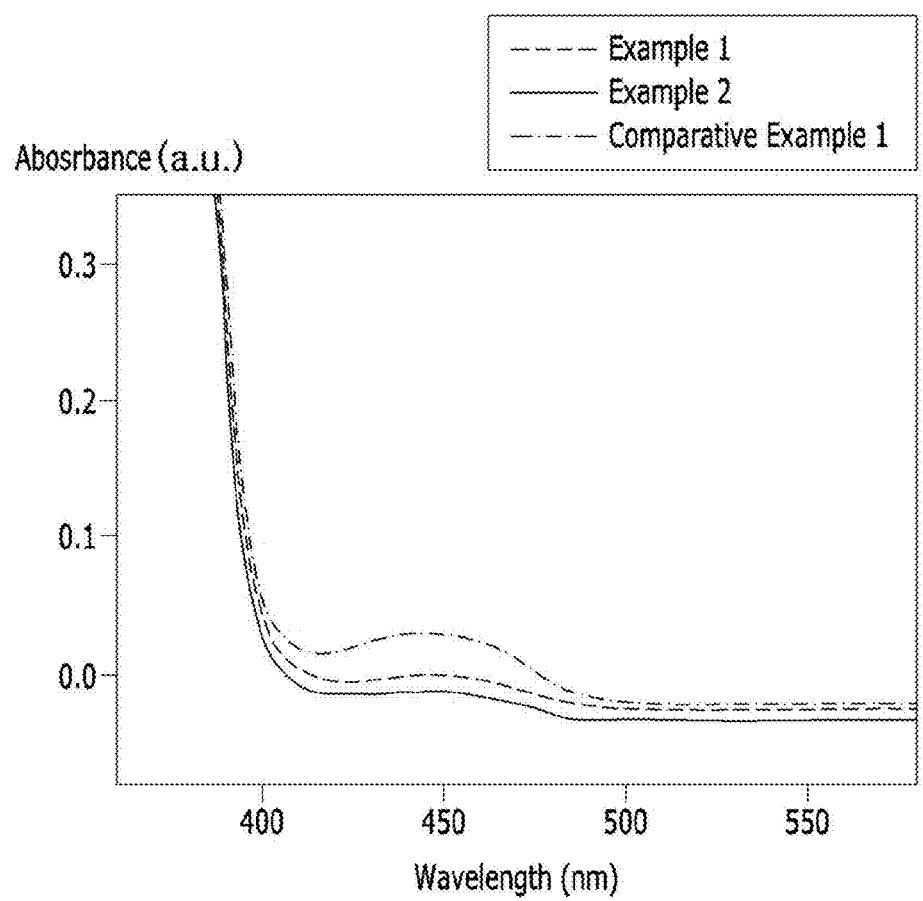
FIG. 9 is graphs of absorbance (arbitrary units, a. u.) versus wavelength (nanometers, nm) showing light absorbance of the films prepared by heating the compositions according to Comparative Example 1, Example 1, and Example 2 from room temperature to 300° C. at heating rate of 3° C./min, respectively.
Figure 10:
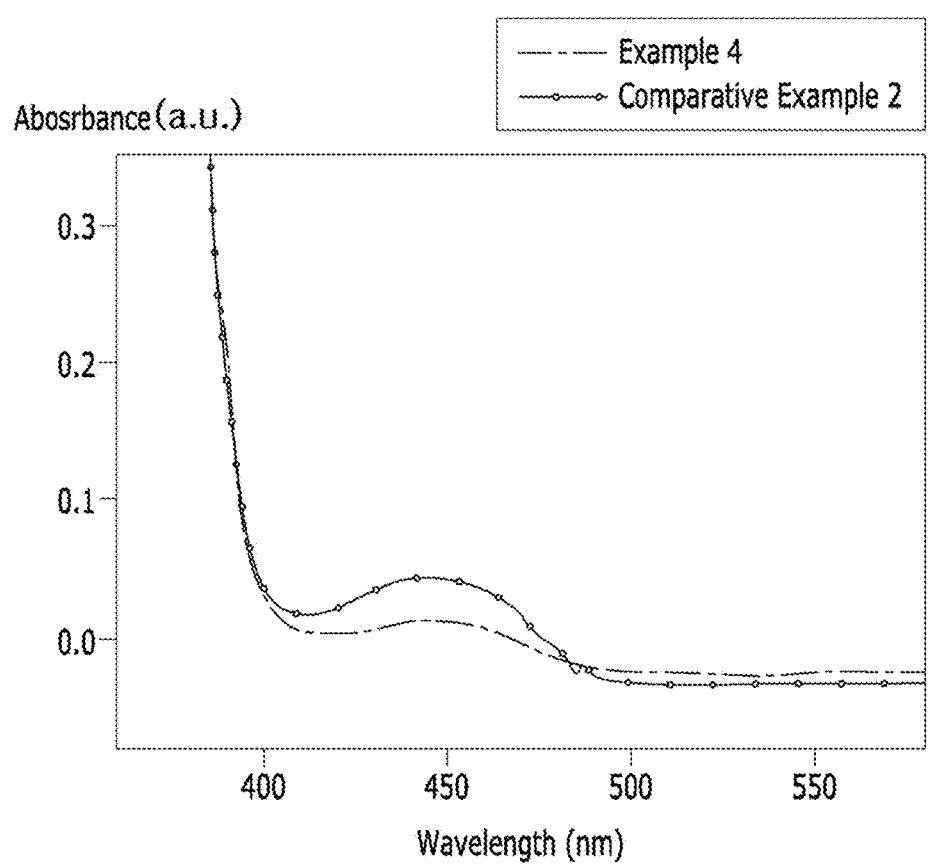
FIG. 10 is graphs of absorbance (arbitrary units, a. u.) versus wavelength (nanometers, nm) showing light absorbance of the films prepared by heating the compositions according to Comparative Example 2, and Example 4 from room temperature to 300° C. at heating rate of 3° C./min, respectively.

Meanwhile, as shown from FIGS. 9 and 10, the films prepared from the compositions according to the examples have further lower light absorbance at a wavelength of about 400 nm to about 480 nm than the films prepared from the compositions according to the comparative examples. This shows that the film according to the embodiments is not yellowish.

The article including the poly(amide-imide) copolymer may have a yellowness index ("YI") of about 3% or less, for example, of about 2.85% or less. When the yellowness index ("YI") of the article is within this range, the article may be transparent and colorless.

The article including the poly(amide-imide) copolymer may have haze of about 1% or less. When the haze of the article is within the range, the article may be transparent enough to have excellent or improved clarity.

The article including the poly(amide-imide) copolymer, for example a film, may have a thickness of about 0.01 micrometers (μm) to about 1,000 μm, but the disclosure is not limited to this and the thickness may be adjusted according to the usage.

According to an embodiment the article has excellent optical properties, heat resistance, mechanical strength, and flexibility of poly(imide-amide) copolymer, and thus the article may be used for a transparent film for window cover glass of an optical device, for example, a flexible display device, and the like.

Hereinafter, the technology of this disclosure is described in detail with reference to examples. The following examples and comparative examples are not restrictive but are illustrative.

EXAMPLES

Synthesis Examples 1 to 3: Synthesis of poly(imide-amide) copolymer powder

Synthesis Examples 1 to 3

4,200 milliliters (mL) of N,N-dimethyl acetamide ("DMAC"), as a solvent, is added in a 5 liter (L) round-bottomed flask, and then 2,2'-bis(trifluoromethyl)benzidine ("TFDB"), terephthaloyl chloride ("TPCl"), 3,3',4,4'-biphenyltetracarboxylic dianhydride ("BPDA"), and 2,2-bis(3,4-dicarboxyphenyl)hexafluoropropane dianhydride ("6FDA") are added to the flask in a ratio as described in Table 1 below. The mixtures are dissolved and reacted with agitation at 30° C. for about 2 hours to about 24 hours to produce the precursors of poly(imide-amide) copolymer.

Upon completion of the polymerization reaction, precipitation reaction is performed by adding a mixture of 50 liters of water and 20 liters of ethanol to the flask to remove HCl as the by-product. The precipitate was filtered and grinded to form a solid material, and dried at about 100° C. to about 150° C. for about 12 hours to obtain precursors of poly (imide-amide) copolymer in a powdered state.

TABLE 1

| | ratio (mol %) | | | |
| --- | --- | --- | --- | --- |
| | TFDB | TPCL | BPDA | 6FDA |
| Synthesis Ex. 1 | 100 | 46 | 30 | 24 |
| Synthesis Ex. 2 | 100 | 55 | 18 | 27 |
| Synthesis Ex. 3 | 100 | 43 | 37 | 20 |

Examples 1 to 6 and Comparative Examples 1 to 3: Manufacturing Articles Containing Poly(imide-amide) copolymer 20 grams of each precursor of poly(imide-amide) copolymer prepared in Synthesis Examples 1 to 3 is dissolved in 200 grams of DMAc, 2 grams of acetic acid anhydride or a mixture of an acetic acid anhydride and pyridine is added to each solution to produce the compositions according to Examples 1 to 6.

Further, each precursor of poly(imide-amide) copolymer prepared in Synthesis Examples 1 to 3 is dissolved in DMAc, and neither acetic acid anhydride nor pyridine is added to each solution to produce the compositions according to Comparative Examples 1 to 3.

Components of the compositions according to Examples 1 to 6 and Comparative Examples 1 to 3 are summarized in Table 2 below.

TABLE 2

| | Powder of precursor of copolymer | Additional component |
| --- | --- | --- |
| Comparative Example 1 | Synthesis Example 1 | — |
| Example 1 | Synthesis Example 1 | Acetic acid anhydride |
| Example 2 | Synthesis Example 1 | Acetic acid anhydride + pyridine |
| Comparative Example 2 | Synthesis Example 2 | — |
| Example 3 | Synthesis Example 2 | Acetic acid anhydride |
| Example 4 | Synthesis Example 2 | Acetic acid anhydride + pyridine |
| Comparative Example 3 | Synthesis Example 3 | — |
| Example 5 | Synthesis Example 3 | Acetic acid anhydride |

TABLE 2-continued

| | Powder of precursor of copolymer | Additional component |
|---|---|---|
| Example 6 | Synthesis Example 3 | Acetic acid anhydride + pyridine |

Preparation Example and Experimental Example 1: Manufacturing Film and Evaluation of Optical Properties and Mechanical Properties Poly(imide-amide) films are manufacture by using the compositions according to Examples 1 to 6 and Comparative Examples 1 to 3 and the properties of the films are evaluated.

Particularly, a film is manufactured by coating a glass substrate with the compositions prepared in the examples and comparative examples, and heating the coated glass substrate from 25° C. to 300° C. at a heating rate of 26° C./minute in a furnace, or heating the coated glass substrate from 25° C. to 300° C. at a heating rate of 3° C./minute in a convection oven.

The modulus, transmittance of light at a wavelength range of 350 nanometers to 750 nanometers, transmittance of light at a wavelength of 430 nanometers, yellowness index ("YI"), and haze of the films prepared are measured and summarized in Table 3 below.

Transmittance of light, YI, and haze are measured by using KONICA MINOLTA Spectrophotometer.

Modulus is determined by using Universal Tensile Machine of Instron Co., Ltd. Samples for measuring modulus have a width of 1 centimeter, a length between the grips of 10 centimeter, and a cross head speed of 24 millimeters per minute (mm/min).

TABLE 3

| | Heating rate (° C./min) | Modulus (GPa) | T@ total (%) | T@ 430 nm (%) | YI (%) | Haze (%) |
|---|---|---|---|---|---|---|
| Comparative Example 1 | 26° C./min | Not determined | 88.30 | 85.85 | 2.79 | 1.11 |
| Example 1 | 26° C./min | Not determined | 88.48 | 86.08 | 2.62 | 0.66 |
| Example 2 | 26° C./min | Not determined | 88.47 | 86.06 | 2.63 | 0.93 |
| Comparative Example 1 | 3° C./min | Not determined | 88.50 | 85.54 | 3.04 | 0.61 |
| Example 1 | 3° C./min | Not determined | 88.56 | 86.00 | 2.72 | 0.61 |
| Example 2 | 3° C./min | 6.2 | 88.54 | 85.83 | 2.83 | 0.56 |
| Comparative Example 2 | 26° C./min | Not determined | 88.51 | 86.04 | 2.56 | 1.02 |
| Example 3 | 26° C./min | Not determined | 88.72 | 86.35 | 2.46 | 0.55 |
| Example 4 | 26° C./min | Not determined | 88.69 | 86.45 | 2.41 | 0.90 |
| Comparative Example 2 | 3° C./min | Not determined | 88.77 | 86.14 | 2.68 | 0.50 |
| Example 4 | 3° C./min | 6.5 | 88.78 | 86.38 | 2.51 | 0.68 |
| Comparative Example 3 | 3° C./min | 6.2 | 88.27 | 85.21 | 3.11 | 0.44 |
| Example 6 | 3° C./min | 6.1 | 88.23 | 85.69 | 2.84 | 0.39 |

Figure 3:
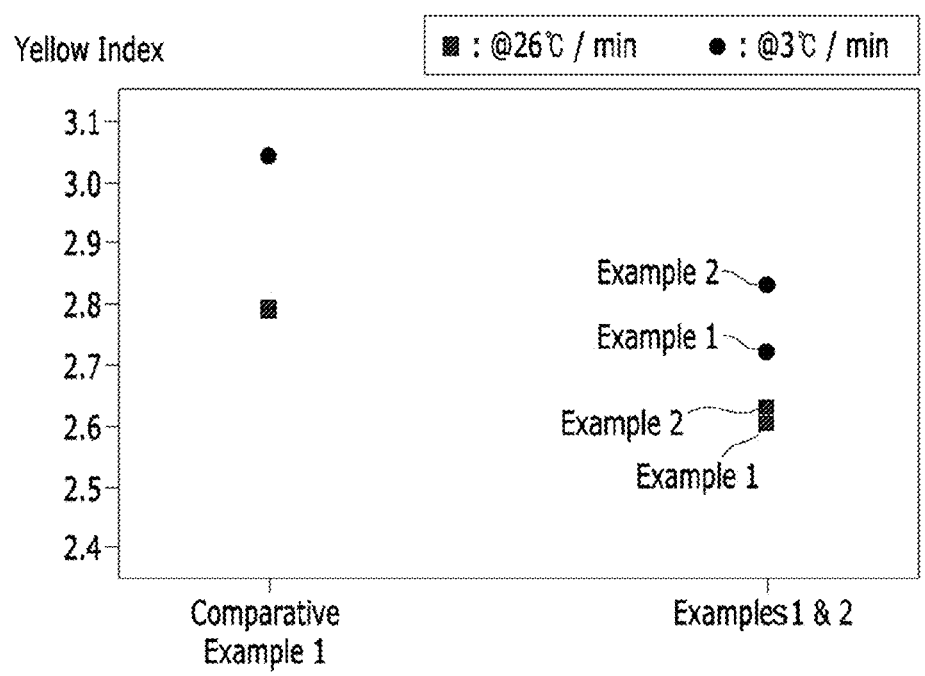
FIG. 3 is a diagram showing yellowness index of the films prepared by heating the compositions according to Comparative Example 1, Example 1, and Example 2 from room temperature to 300° C. at heating rates of 26° C./min and 3° C./min, respectively.
Figure 4:
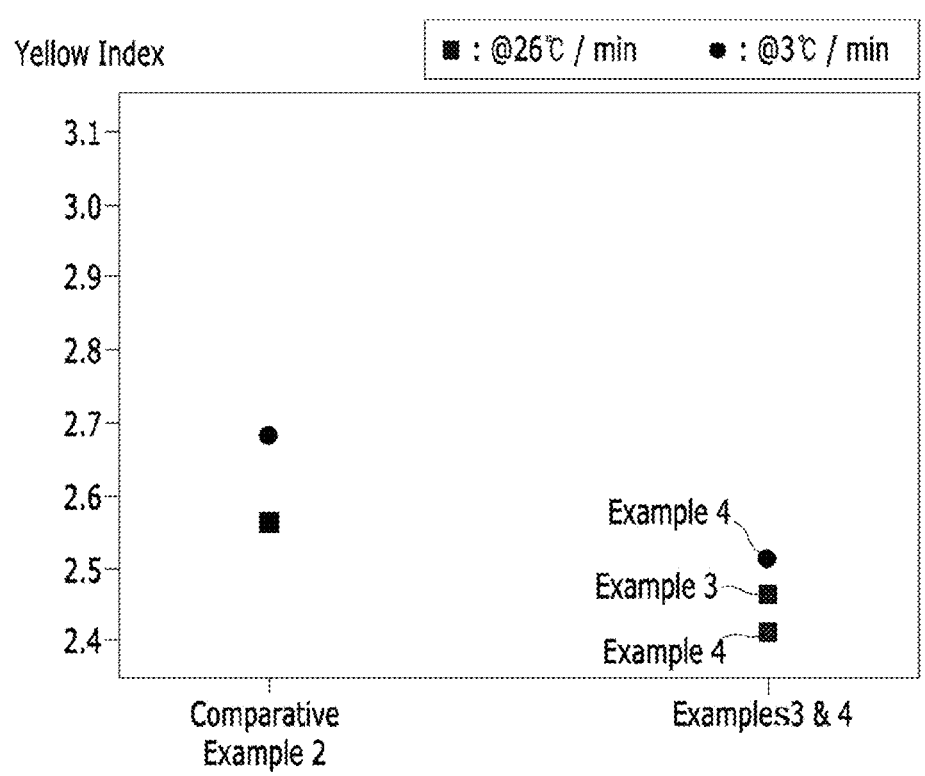
FIG. 4 is a diagram showing yellowness index of the films prepared by heating the compositions according to Example 3 and Example 4 from room temperature to 300° C. at heating rates of 26° C./min and 3° C./min, respectively.

Further, films are prepared by using the compositions according to Comparative Example 1 and Examples 1 and 2 and different heating rate disclosed above, and the yellowness index of the films are depicted in FIG. 3. In addition, films are prepared by using the compositions according to Comparative Example 2 and Examples 3 and 4 and different heating rate from the above, and the yellowness index of the films are depicted in FIG. 4. Again, films are prepared by using the compositions according to Comparative Example 3 and Example 6 and heating rate of 3° C./min, and the yellowness index of the films are depicted in FIG. 5.

Figure 5:
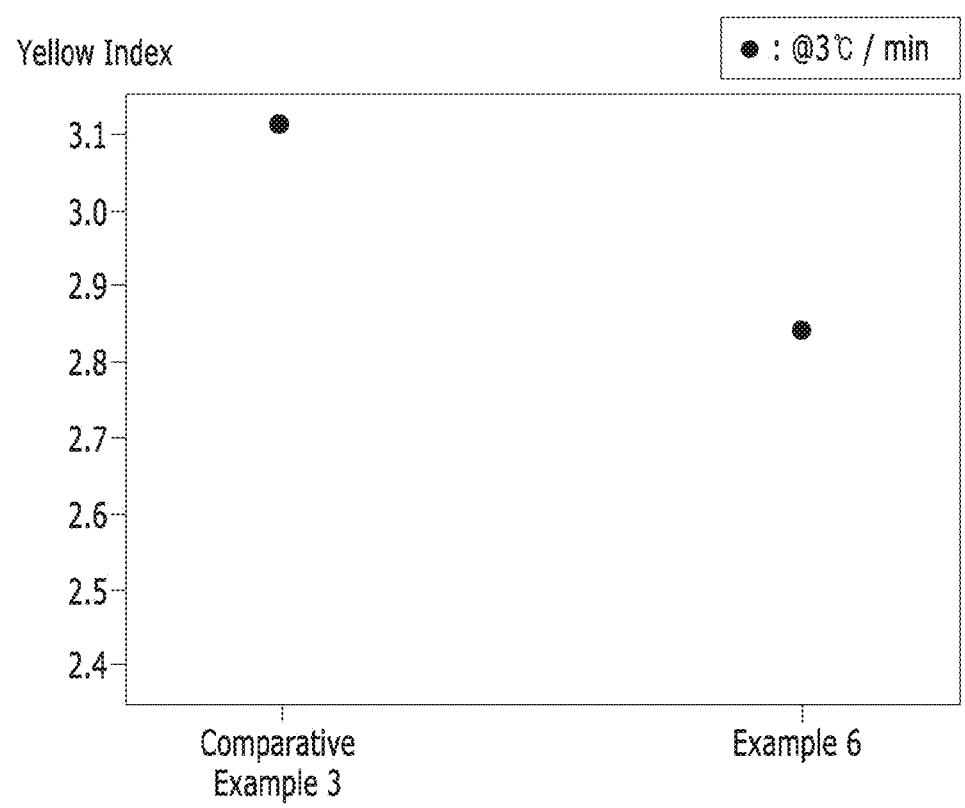
FIG. 5 is a diagram showing yellowness index of the films prepared by heating the compositions according to Comparative Example 3 and Example 6 from room temperature to 300° C. at heating rates of 26° C./min and 3° C./min, respectively.

As shown from FIGS. 3 to 5 and Table 3, the films prepared by using the compositions according to Examples 1 to 6 have reduced yellowness index by at least 0.1 up to 0.3 regardless of the heating rate, compared to the films prepared from the compositions according to Comparative Examples 1 to 3, in which neither acetic acid anhydride nor pyridine is added to the final solution for preparing the film.

As shown from Table 3, although all the transmittances of light of the films prepared from the compositions according to the Examples and Comparative Examples are excellent, the films prepared from the compositions according to the Examples have higher transmittances of light at a wavelength range of 350 nm to 750 nm, as well as the transmittance of light at a wavelength of 430 nm, than the films prepared from the compositions according to the Comparative Examples.

Further, as shown from the modulus described in Table 3, the films prepared from the compositions according to the Examples have sufficient mechanical strength.

Experimental Example 2: Measurement of Content of Amino Group in Films and Observation of Yellowness Index of Films The content of the amino group at a terminal of the films prepared from the compositions according to Examples 1, 2, 4, and 6, and Comparative Examples 1 to 3 using heating rage of 3° C./min are measured from the content of the Schiff's base, and the results are described in Table 4.

TABLE 4

| | Heating rate (° C./min) | YI | Content of amino group in film (mmol/g) |
|---|---|---|---|
| Comparative Example 1 | 3° C./min | 3.04 | 0.0132 |
| Example 1 | 3° C./min | 2.72 | 0.0061 |
| Example 2 | 3° C./min | 2.83 | 0.0056 |
| Comparative Example 2 | 3° C./min | 2.68 | 0.0197 |
| Example 4 | 3° C./min | 2.51 | 0.0098 |
| Comparative Example 3 | 3° C./min | 3.11 | 0.0477 |
| Example 6 | 3° C./min | 2.84 | 0.0024 |

As shown from Table 4, the content of amino group at a terminal of the films prepared from the compositions according to Examples 1, 2, 4, and 6 are reduced by 50% compared to those in the films prepared from the compositions according to Comparative Examples 1 to 3.

Yellowness index of the films have the same tendency as the content of the amino group at a terminal of the films, and thus, the films that have low content of amino group at a terminal have also low yellowness index.

Meanwhile, FIG. 6 shows a photograph of solutions in which the films prepared by heating the compositions according to Comparative Example 1(a), Example 1(b), and Example 2(c) from room temperature to 300° C. at heating rate of 3° C./min, respectively, are dissolved in a solvent (DMAc). FIG. 7 shows a photograph of the solutions in which the films prepared by heating the compositions according to Comparative Example 2(a), Example 3(b), and Example 4(c) from room temperature to 300° C. at heating rate of 3° C./min, respectively, are dissolved in a solvent (DMAc). FIG. 8 is a photograph of the solutions in which the films prepared by heating the compositions according to Comparative Example 3(a), Example 5(b), and Example 6(c) from room temperature to 300° C. at heating rate of 3° C./min, respectively, are dissolved in a solvent (DMAc).

From FIGS. 6 to 8, the films prepared from the compositions according to Examples 1 to 6 are much less yellowish than the films prepared from the compositions according to Comparative Examples 1 to 3.

In addition, FIG. 9 shows graphs of light absorbance of the films prepared by heating the compositions according to Comparative Example 1, Example 1, and Example 2 from room temperature to 300° C. at heating rate of 3° C./min, respectively. FIG. 10 shows graphs of light absorbance of the films prepared by heating the compositions according to Comparative Example 2 and Example 4 from room temperature to 300° C. at heating rate of 3° C./min, respectively.

From FIGS. 9 and 10, the films prepared from the compositions according to Examples 1, 2, and 4 show lower absorbance of light than the films prepared from the compositions according to Comparative Examples 1 and 2, especially, at the wavelength of about 400 nm to about 480 nm. This result also shows that the films prepared from the compositions according to the exemplary embodiments have low yellowness.

While this disclosure has been described in connection with what is presently considered to be practical exemplary embodiments, it is to be understood that the present inventive concept is not limited to the disclosed embodiments, but, on the contrary, is intended to cover various modifications and equivalent arrangements which are included within the spirit and scope of the appended claims.

What is claimed is:

1. An article comprising a polymer, the polymer consisting of a poly(imide-amide) copolymer, the poly(imide-amide) copolymer having a terminal amino group in an amount of less than or equal to about 0.01 millimole per gram, and the poly(imide-amide) copolymer obtained from a reaction of a tetracarboxylic acid dianhydride, a diamine, and a carboxylic acid dichloride, wherein the tetracarboxylic acid dianhydride consists of 3,3',4,4'-biphenyltetracarboxylic dianhydride and 2,2-bis-(3,4-dicarboxyphenyl)hexafluoropropane dianhydride, the diamine consists of 2,2'-bis(trifluoromethyl)benzidine, and the carboxylic acid dichloride consists of terephthaloyl chloride.

2. The article according to claim 1, wherein the article is a film, fiber, coating material, or an adhesive.

3. A display device comprising the article according to claim 1.

4. The display device according to claim 3, wherein the display device is a flexible display device.

5. A method of preparing an article comprising a poly(imide-amide) copolymer, the poly(imide-amide) copolymer having an amount of a terminal amino group of less than or equal to about 0.01 millimole per gram, the method comprising:
reacting a tetracarboxylic acid dianhydride represented by Chemical Formula 1, a diamine, and a carboxylic acid dichloride to form a reaction product;
removing hydrochloric acid (HCl) from the reaction product to obtain an HCl-removed reaction product;
adding a solvent and an acid anhydride to the HCl-removed reaction product to produce a mixture; and
heating the mixture to about 300° C. to remove the solvent and provide an article comprising a poly(imide-amide) copolymer having an amount of a terminal amino group of less than or equal to about 0.01 millimole per gram:

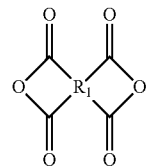

Chemical Formula 1 wherein in Chemical Formula 1,
$R^1$ is a C6 to C30 aromatic organic group, wherein the C6 to C30 aromatic organic group comprises one aromatic ring, two or more aromatic rings fused together to provide a condensed ring system, or two or more aromatic rings linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, —C(=O)NH—, a C3 to C10 cycloalkylene group, and a C6 to C15 arylene group, and wherein the diamine is at least one selected from the following chemical formulae:

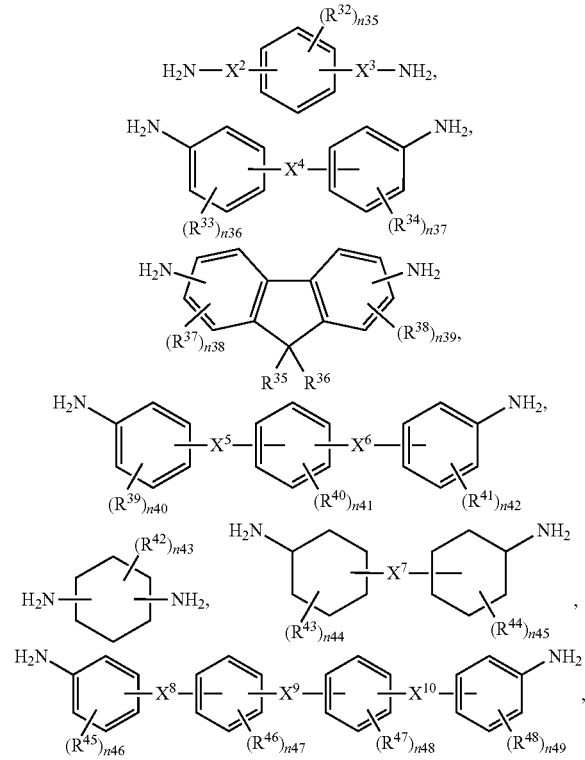

wherein in the above chemical formulae,
$R^{32}$ to $R^{41}$ and $R^{45}$ are the same or different and are each independently a halogen, a nitro group, a C1 to C15 alkyl group, a C1 to C15 alkoxy group, a C1 to C15 fluoroalkyl group, a C3 to C15 cycloalkyl group, a C3 to C15 heterocycloalkyl group, a C3 to C15 cycloalkoxy group, a C6 to C15 aryl group, a C6 to C15 aryloxy group, or a C2 to C15 heteroaryl group, $X^2$ to $X^6$ and $X^8$ to $X^{10}$ are the same or different and are each independently a single bond, a C1 to C10 alkylene group, a C3 to C10 cycloalkylene group, a C5 to C40 heterocycloalkylene group, a C6 to C15 arylene group, a C3 to C40 heteroarylene group, —SO$_2$—, —O—, —C(=O)—, or a combination thereof, n35 to n37, n40 to n42, and n46 to n49, are integers ranging from 0 to 4, and n38 and n39 are integers ranging from 0 to 3.

6. The method according to claim 5, wherein the adding a solvent and an acid anhydride to the HCl-removed reaction product to produce a mixture comprises:

adding a solvent to the HCl-removed reaction product to produce a mixture comprising about 5 percent by weight to about 30 percent by weight of the HCl-removed reaction product and about 95 percent by weight to about 70 percent by weight % of the solvent in the mixture, and adding an acid anhydride to the mixture in an amount of about 1 percent by weight to about 30 percent by weight of the acid anhydride based on weight of the HCl-removed reaction product.

7. The method according to claim 5, wherein the adding a solvent and an acid anhydride to the HCl-removed reaction product further comprises adding pyridine to the mixture in an amount of about 1 percent by weight to about 30 percent by weight based on weight of the HCl-removed reaction product.

8. The method according to claim 5, wherein the acid anhydride is at least one selected from acetic anhydride, maleic anhydride, phthaloic anhydride, glutaric anhydride, benzoic anhydride, hexanoic acid anhydride, and naphthanoic acid anhydride.

9. The method according to claim 5, wherein the solvent is at least one selected from:

a sulfoxide solvent comprising dimethyl sulfoxide, diethyl sulfoxide, or a combination thereof;

a formamide solvent comprising N,N-dimethyl formamide, N,N-diethyl formamide, or a combination thereof;

an acetamide solvent, comprising N,N-dimethyl acetamide, N,N-diethyl acetamide, or a combination thereof;

a pyrrolidone solvent comprising N-methyl-2-pyrrolidone, N-vinyl-2-pyrrolidone, or a combination thereof;

a phenolic solvent comprising phenol, o-, m-, or p-cresol, xylenol, halogenated phenol, catechol, or a combination thereof; and an aprotic bipolar solvent comprising hexamethyl phosphoramide, γ-butyrolactone, or a combination thereof.

10. An article prepared by the method according to claim 5, wherein the article comprising a polymer, the polymer consisting of a poly(imide-amide) copolymer, the poly(imide-amide) copolymer having a terminal amino group in an amount of less than or equal to about 0.01 millimole per gram.

11. The article according to claim 10, wherein the article is a film, a fiber, a coating material, or an adhesive.

* * * * *